(12) United States Patent
Matsushita et al.

(10) Patent No.: US 6,396,189 B1
(45) Date of Patent: May 28, 2002

(54) STATOR ASSEMBLY OF ROTARY ELECTRIC DEVICE AND METHOD OF ASSEMBLING THE SAME

(75) Inventors: Kunitake Matsushita, Toyohashi; Takayuki Yamawaki, Kakewgawa; Hiroshi Sano, Iwata-gun; Kazuo Muramatsu, Hukuroi, all of (JP)

(73) Assignee: Minebea Co., Ltd., Nagano (JP)

( * ) Notice: Subject to any disclaimer, the term of this patent is extended or adjusted under 35 U.S.C. 154(b) by 912 days.

(21) Appl. No.: 08/531,613

(22) Filed: Sep. 21, 1995

(30) Foreign Application Priority Data

Sep. 21, 1994 (JP) .............................................. 6-252980

(51) Int. Cl.$^7$ ............................................... H01L 41/08
(52) U.S. Cl. .......................................... 310/257; 310/43
(58) Field of Search ............................ 310/43, 45, 179, 310/194, 216–218, 254, 257–259

(56) References Cited

U.S. PATENT DOCUMENTS

| | | | |
|---|---|---|---|
| 3,558,940 A | * 1/1971 | Chestnut | 310/257 X |
| 3,633,055 A | 1/1972 | Maier | 310/156 |
| 4,794,292 A | * 12/1988 | Torisawa | 310/257 |
| 4,841,190 A | * 6/1989 | Matsushita et al. | 310/257 |
| 4,926,540 A | * 5/1990 | Kato | 310/43 X |
| 5,121,017 A | * 6/1992 | Yamamoto et al. | 310/257 X |

FOREIGN PATENT DOCUMENTS

| | | |
|---|---|---|
| EP | A-0 289 043 | 11/1988 |
| EP | 0 703 660 A1 | 3/1996 |
| GB | A-2 245 107 | 12/1991 |

\* cited by examiner

Primary Examiner—Mark O. Budd
(74) Attorney, Agent, or Firm—Staas & Halsey LLP

(57) ABSTRACT

A stator assembly of a rotary electric device is manufactured and assembled at reduced cost with an enhanced level of precision. A stator assembly of a rotary electric device comprising a yoke provided with a plurality of stationary magnetic poles and a yoke plate bonded to said yoke by means of synthetic resin in a mold to form an integral unit for enclosing a stator coil is assembled by bringing an alignment pin arranged on a jig for combining the yoke and the yoke plate into engagement with a corresponding alignment sections of the yoke and the yoke plate to put the yoke and the yoke plate together in order to produce a unitary stator assembly and a step of placing the unitary stator assembly of the yoke and the yoke plate in an injection metal mold with said alignment section fitted to an alignment pin arranged in the mold for mutual engagement and injecting synthetic resin into the mold to bond the yoke and the yoke plate together.

4 Claims, 4 Drawing Sheets

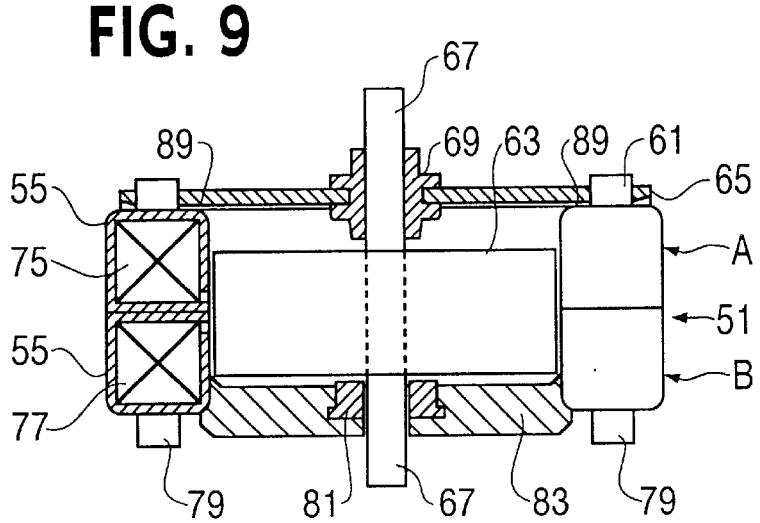
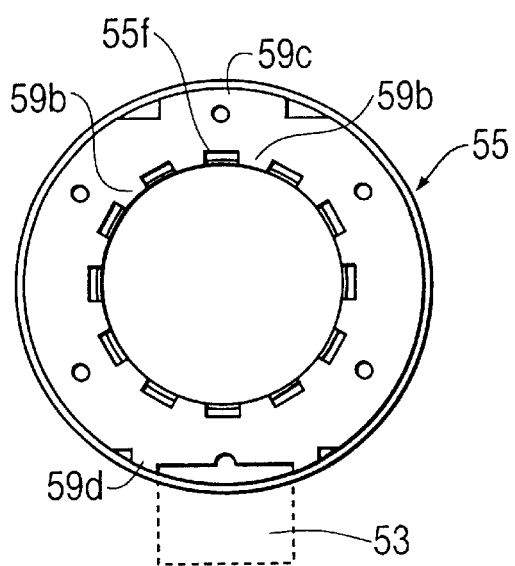
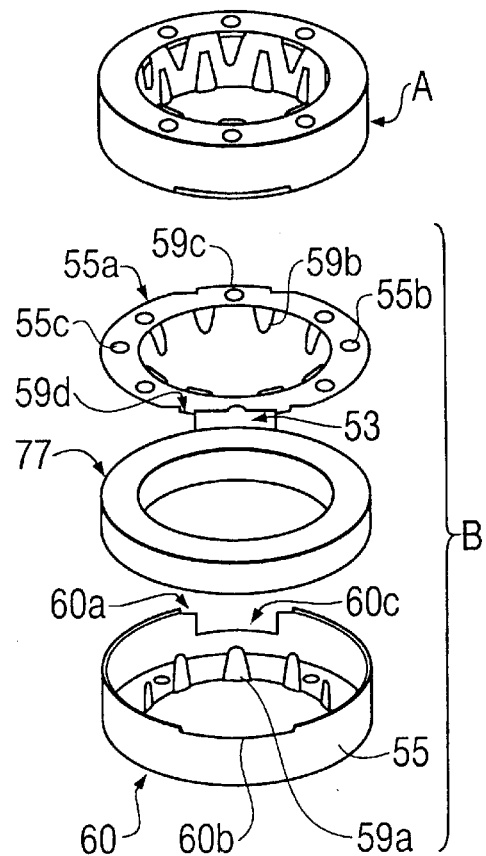

STATOR ASSEMBLY OF ROTARY ELECTRIC DEVICE AND METHOD OF ASSEMBLING THE SAME

BACKGROUND OF THE INVENTION

1. Field of the Invention

This invention relates to a stator assembly of a rotary electric device and a method of assembling the same and, more particularly, it relates to a stator assembly of a stepping motor and a method of assembling the same.

2. Description of the Prior Art

A stepping motor has a wide variety of applications including OA device and computer peripheral devices and, in most cases, it is an indispensable component of such devices.

While stepping motors are classified into PM, VR and HB types depending on the structure of the rotor, they commonly comprise a rotor that revolves inside and which is borne by a stator assembly having a number of stationary magnetic poles.

FIG. 8 of the accompanying drawings is an exploded perspective view of a known stepping motor. Referring to FIG. 8, it comprises a bottomed cylindrical stator assembly 51 having an inner structure as will be described in detail hereinafter. The stator assembly 51 carries a terminal section 53 on the outer periphery. A number of wires (not shown) are soldered to the terminal section 53 to connect the motor to external circuits. The stator assembly has yokes 55 made from magnetic metal plates as outer peripheral members thereof, upper and lower exposed magnetic poles 57 and 59 arranged respectively on the upper and lower halves of the inner periphery thereof and a number of alignment projections 61 arranged on the top of the assembly for centering.

The stepping motor also comprises a rotor 63 designed to revolve inside the stator assembly 51 and carrying on the outer periphery thereof N and S magnetic poles and a top plate rigidly secured to the top of the stator assembly 51. A bearing 69 for carrying the rotary shaft 67 of the rotor 63 is rigidly fitted to the center of the top plate 65. Alignment through bores 71 are arranged on an imaginary circle around the bearing 69 at positions corresponding to respective alignment projections. Each of the alignment through bores 71 is provided with a projection 73 for welding a resistor there standing downward toward the stator assembly 51 at a position away from the bearing 69 along the periphery thereof.

FIG. 9 is a sectional side view of the stepping motor of FIG. 8 having the above described components The stator assembly of the stepping motor additionally comprises an upper stator coil 75 and a lower stator coil 77. For assembling the stator assembly 51, a subassembly consisting of a pair of cup-shaped yokes 55 carrying a number of stationary magnetic poles and an upper stator coil 75 arranged inside the yokes and another subassembly consisting of a pair of cup-shaped yokes 55 carrying a number of stationary magnetic poles and a lower stator coil 77 arranged inside the yokes are laid one on the other in an injection molding type metal mold and then synthetic resin is injected into the inside so that the stator assembly 51 is assembled and produced as a unitary entity. A number of alignment projections 61 are formed with synthetic resin at the same time. Note that reference numeral 79 in FIG. 9 denotes synthetic residual resin remaining in the injection port of the metal mold and reference numeral 81 denotes a bearing held in position by a block of synthetic resin 83 injected into the stator assembly. As seen from FIGS. 8 and 9, the stator assembly 51 is realized by bonding an upper stator subassembly A and a lower stator subassembly B, which will be described in detail hereinafter.

FIG. 10 is an exploded perspective view of the above described stator assembly 51. The illustrated components are identically formed and laid one of the other to produce vertically arranged mirror images before they are bonded together to make a unitary entity. As seen from FIG. 10, the lower stator subassembly B comprises a lower cup 60 provided with a plurality of lower stationary magnetic poles 59a standing upward from the bottom thereof and a lower stator coil 77 arranged in the inside thereof. A yoke plate 55a provided with a plurality of suspended lower stationary magnetic poles 59b and projections 59c is secured to the top of the lower cup 60 from above with the projections 59c fitted into corresponding recesses. Under this condition, a terminal section 53 of the lower coil 77 comes engaged with a deepest central section 60c of a notch 60a of the lower cup 60. Note that the yoke plate 55a is provided with an alignment bore 55b and an alignment projection 55c. The upper stator subassembly A is assembly in much the same way as the lower stator subassembly B. FIG. 11 is a plan view of the lower stator subassembly B.

For aligning a yoke plate 55a with a lower cup 60 of a rotary electric device having a configuration as described above and fitting the former into the latter, the alignment projection 59c of the yoke plate 55a is fitted into the notch 60a of the lower cup 60 and projections 59d of the yoke plate 55a are engaged with the deepest central section 60c of the lower cup 60. Then, for placing the upper stator subassembly A on the lower stator subassembly B in position, the alignment projection 55c arranged on the yoke plate of the upper stator subassembly A if fitted into the alignment bore 55b formed in the yoke plate of the lower stator subassembly B and the alignment bore 55b formed in the yoke plate of the upper stator subassembly A is engaged with the alignment projection 55c on the yoke plate of the lower stator subassembly B.

With the above arrangement, the alignment projection 59c of the yoke plate 55a of the lower cup 60 and the matching notch 60a of the lower cup 60 have respective tolerances, while the alignment projection 59d of the yoke plate 55a and the matching deepest section 60c of the lower cup 60 have respective tolerances. On the other hand, the alignment projection 55c of the yoke plate of the upper stator subassembly A and the matching bore 55b of the yoke plate of the lower stator subassembly B have respective tolerances, while the alignment projection 55c of the yoke plate of the lower stator subassembly B and the matching bore 55b of yoke plate of the upper stator subassembly A have respective tolerances.

Thus, when the upper and lower stator subassemblies are bonded together with synthetic resin in a mold, the above tolerances can add up to a significantly large error for the positions of the stationary magnetic poles and a reduced alignment accuracy of the components that can by turn result in a poor performance of the rotary electric device.

SUMMARY OF THE INVENTION

In view of the above identified problems and other problems of conventional electric motors of the type under consideration, it is therefore the object of the present invention to provide a stator assembly comprising stationary magnetic poles arranged with an enhanced positional accuracy as compared with those of conventional electric motors and a method of assembling the same in a simple manner.

According to the invention, the above object is achieved by providing a stator assembly of the rotary electric device comprising a yoke provided with a plurality of stationary magnetic poles and a yoke plate bonded to said yoke by means of synthetic resin in a mold to form an integral unit for enclosing a stator coil, characterized in that it has small holes formed by alignment pins in the molded synthetic resin.

According to the present invention, there is also provided a method of assembling a stator assembly of a rotary electric device comprising a yoke provided with a plurality of stationary magnetic poles and a yoke plate bonded to said yoke by means of synthetic resin in a mold to form an integral unit for enclosing a stator coil, characterized in that it comprises a step of bringing an alignment pin arranged on a jig for combining the yoke and the yoke plate into engagement with a corresponding alignment sections of the yoke and the yoke plate to put the yoke and the yoke plate together in order to produce a unitary stator assembly and a step of placing the unitary stator assembly of the yoke and the yoke plate in an injection metal mold with said alignment section fitted to an alignment pin arranged in the mold for mutual engagement and injecting synthetic resin into the mold to bond the yoke and the yoke plate together.

With the above arrangement, an alignment pin arranged on a jig for combining the yoke and the yoke plate is brought into engagement with a corresponding alignment sections of the yoke and the yoke plate to put the yoke and the yoke plate together in order to produce a unitary stator assembly and thereafter the unitary stator assembly of the yoke and the yoke plate is placed in an injection metal mold with said alignment section fitted to an alignment pin arranged in the mold for mutual engagement and synthetic resin is injected into the mold to bond the yoke and the yoke plate together.

BRIEF DESCRIPTION OF THE DRAWINGS

FIG. 9 is a schematic section side view of a conventional stator assembly.

FIG. 10 is an exploded schematic perspective view of a lower stationary subassembly of a conventional stator assembly, showing its stationary magnetic poles.

FIG. 11 is a plan view of the lower stator sub-assembly.

DESCRIPTION OF THE PREFERRED EMBODIMENTS

Figure 1:
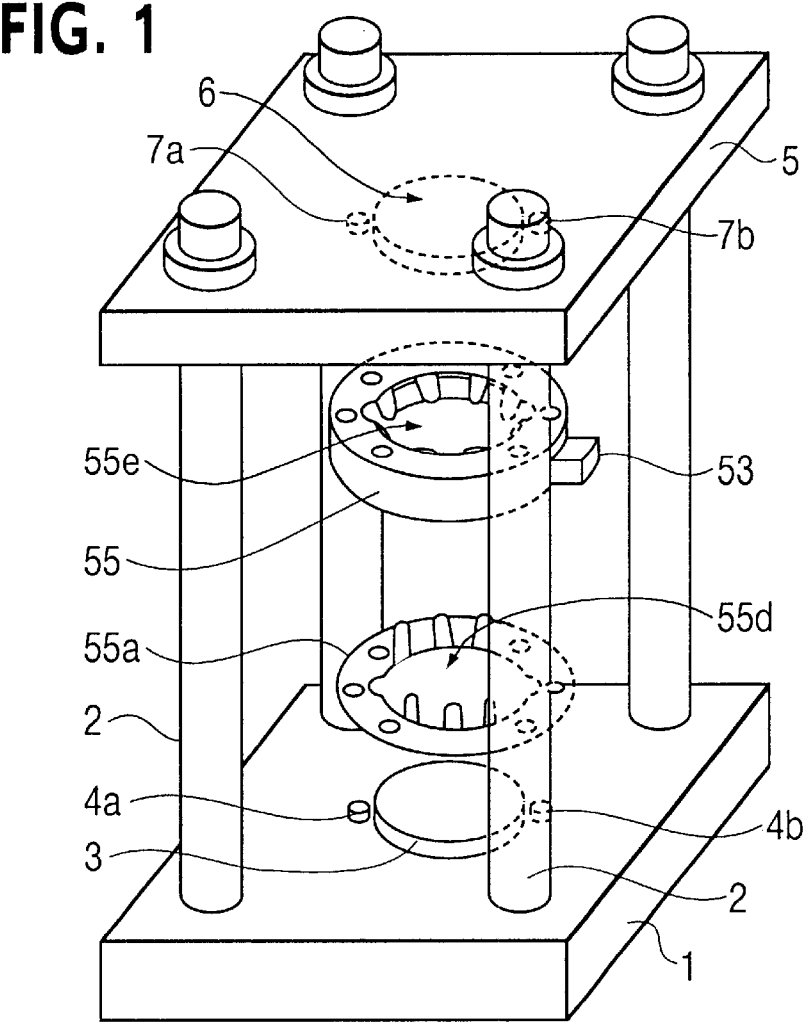
FIG. 1 is a schematic perspective view of a jig for assembling a stator assembly according to the invention.

Now, a preferred embodiment of the invention will be described in detail by referring to the accompanying drawings. Note that the components that are the same or similar to those of the illustrated conventional stator assembly are denoted by the same reference symbols and will not be described any further. FIG. 1 is a schematic perspective view of the embodiment, where a yoke 55 containing upper and lower stator coils and yoke plate 55a are held together by means of a jig. In FIG. 1, reference numeral 1 denotes a base board of the jig that carries thereon four guide poles 2. A base disc 3 is arranged at the center of the upper surface of the yoke plate 55a such that it can be snugly put into a bore 55d formed at the center of the yoke plate 55a. A pair of alignment pins 4a, 4b are arranged along the outer periphery of the base disc 3 and standing from the base board 1. Reference numeral 5 denotes a pressure plate that can be vertically moved along the guide poles 2. Another base disc 6 is arranged at the center of the lower surface of the pressure plate 5 and vis-a-vis the vase disc 3 such that it can be snugly put into a bore 55e formed at the center of the yoke 55. A pair of alignment pins 7a, 7b are arranged along the outer periphery of the base disc 6 and standing downward from the pressure plate 5. The pressure plate 5 can be moved vertically by means of a driving power source (not shown).

Figure 2:
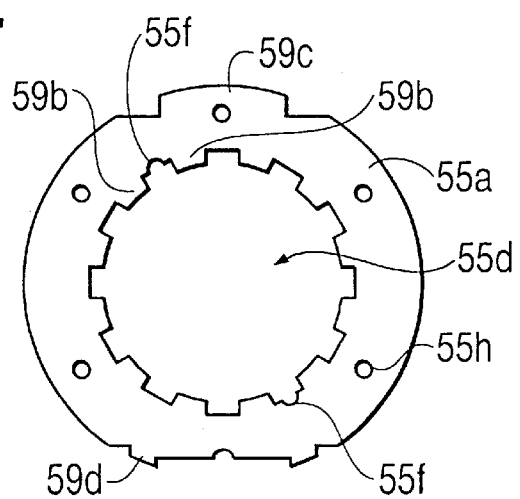
FIG. 2 is a front view of a yoke plate according to the invention.
Figure 3:
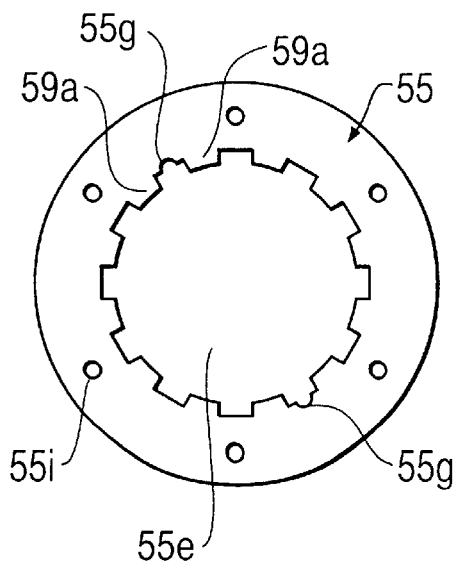
FIG. 3 is a front view of another yoke plate according to the invention.
Figure 4:
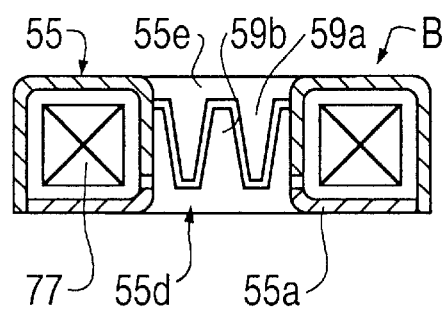
FIG. 4 is a front view of a yoke and a yoke plate that are put together.

FIG. 2 is a front view of the yoke plate 55a. A semicircular alignment notch 55f is formed between a pair of selected and adjacently disposed lower stationary magnetic poles 59b, 59b and another semicircular alignment notch 55f is arranged opposite to the first alignment notch 55f with the bore 55d disposed therebetween. FIG. 3 is a front view of the yoke 55. A semicircular alignment notch 55g is formed between a pair of selected and adjacently disposed lower stationary magnetic poles 59a, 59a and another semicircular alignment notch 55g is arranged opposite to the first alignment notch 55g with the bore 55e disposed therebetween. Reference symbols 55h and 55i denote respective resin inlet bores.

For assembling the lower stationary subassembly B, the yoke plate 55a is placed around the base disc 3 on the base board 1 such that the base disc 3 fits into the bore 55d of the yoke plate 55a with the lower stationary magnetic poles 55b standing upright. A lower stator coil 77 is fitted into the yoke 55 in advance. In FIG. 1, there is shown a terminal section 53 annexed to the lower stator coil 77. The yoke 55 with the lower stator coil 77 fitted therein is then placed to surround the disc base 6 under the pressure plate 5 such that the base disc 6 also fits into the bore 55e of the yoke 55. The yoke 55 may be stably secured to the pressure plate if a permanent magnet is embedded into the pressure plate 5 at the location where the yoke 55 abuts the pressure plate 5.

As the yoke plate 55a and the base board 1 are put together, the alignment pins 4a, 4b are fitted into the respective alignment notches 55f of the yoke plate 55a. Likewise, as the yoke 55 and the pressure plate 5 are put together, the alignment pins 7a, 7b are fitted into the respective alignment notches 55g, 55g of the yoke 55.

As the yoke plate 55a and yoke 55 are respectively secured to the base board 1 and pressure plate 5, the pressure plate 5 comes down to press the yoke 55 onto the yoke plate 55a until the yoke plate 55a is forcibly fitted into the yoke 55 such that the outer periphery of the yoke plate 55a is held in contact with the inner wall of the yoke 55 and the yoke 55 and the yoke plate 55a are combined into an integral unit which is the lower stationary subassembly B.

Figure 5:
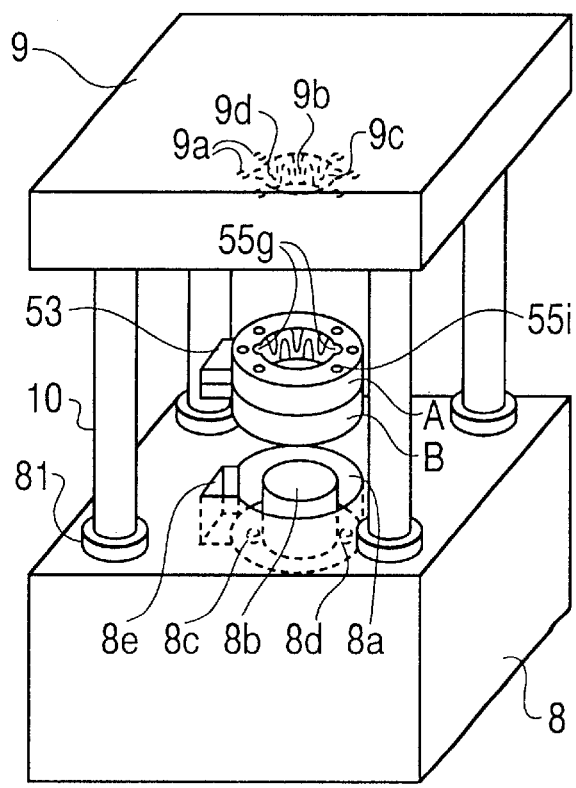
FIG. 5 is a schematic partial perspective view of an injection metal mold for bonding an upper stationary subassembly and a lower stationary subassembly together.

FIG. 5 illustrates part of an injection metal mold for putting the upper stationary subassembly and the lower stationary subassembly B together by means of injection molding. In FIG. 5, reference numeral 8 denotes a lower mold half comprising a die 8*a* disposed at the center thereof for receiving the upper stationary subassembly and the lower stationary subassembly B. A cylindrical column 8*b* is arranged at the center of the die 8*a* so that it is received by the central bores of the lower and upper stationary subassemblies A and B as the latter are put into the lower mold half 8. A pair of alignment pins 8*c*, 8*d* are arranged along the outer periphery of the cylindrical column 8*b* and standing from the bottom of the die 8*a*. Reference numeral 9 denotes an upper mold half. A total of four guide poles 10 extend downward from the respective corners of the upper mold half 9 and are slidably received by respective bearings 8*f* arranged at the four corners of the lower mold half 8 so that the upper mold half 9 may move down toward the lower mold half 8 for a molding operation. The upper mold half 9 is additionally provided on the lower surface thereof and at a position opposite to the die 8*a* with an injection port 9*a* for injecting molten synthetic resin and also with a cavity 9*b* for forming a synthetic resin member 83 designed to hold a bearing 81 of the electric motor to be assembled.

A pair of pointed alignment pins 9*c*, 9 extend downward in the cavity 9*b* so that they are held in engagement in the respective notches 55*g* of the yoke 55 of the upper stationary subassembly A.

The upper stationary subassembly A and the subassembly are put together to make an integral unit in the injection metal mold in a manner as described below. Firstly, the lower stationary subassembly B is put into the die 8*a* is an exactly aligned state as the alignment pins 8*c* and 8*d* are pushed into the respective alignment notches 55*g* of the yoke 55 for mutual engagement. Then, the upper stationary subassembly A is placed on the lower stationary subassembly B as the terminal section 53 of the upper stationary subassembly A is put into the groove 8*e* for preliminary alignment of the upper and lower stationary subassemblies. Then, the upper mold half 9 is lowered until it abuts the lower mold half 8.

During this operation, the alignment pins 9*c*, 9*d* move into the respective notches 55*g* of the upper stationary subassembly A to accurately align the upper and lower stationary subassemblies.

Figure 6:
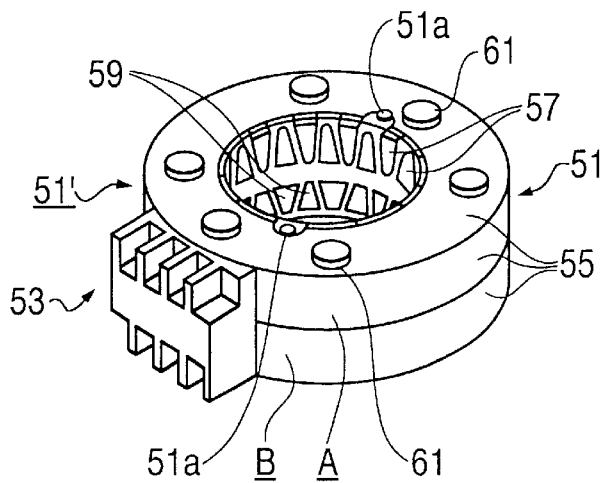
FIG. 6 is a schematic perspective view of a stator assembly produced by molding according to the invention.
Figure 7:
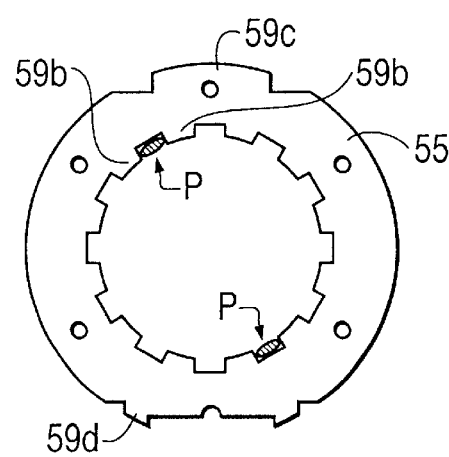
FIG. 7 is a schematic front view of an alternative yoke plate according to the invention.
Figure 8:
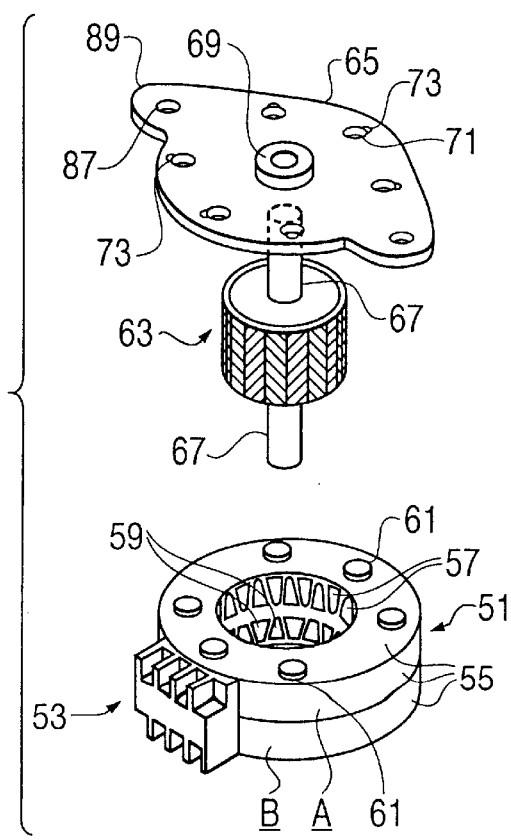
FIG. 8 is an exploded schematic perspective view of a conventional stator assembly.

Then, under this condition, molten synthetic resin is injected into the mold through the injection port 9*a* of the upper mold half 9 until all the space inside the mold is filled with resin flowing into the inside of the upper and lower stationary subassemblies A and B through their respective resin guide holes. Subsequently, the injection metal mold is cooled to set the synthetic resin inside it, which by turn securely holds the upper and lower stationary subassemblies A and B together. FIG. 6 is a schematic perspective view of a stator assembly 51' taken out of the injection metal mold. As seen from FIG. 6, a pair of small holes 51*a*, 51*a* are formed by the alignment pins at the locations of the notches in the stator assembly 51'. Then, a top plate 65 and a bearing 81 are fitted to the stator assembly 51' in order to rotatably receive a rotor 63 as in the case of any conventional stator assemblies.

While alignment pins and notches are used for fitting the yoke 55 and the yoke plate 55*a* to a jig and placing the upper and lower stationary subassemblies in position in an injection metal mold in the above embodiment, the upper and lower stationary subassemblies may alternatively be aligned relative to each other by inserting alignment pins into the stationary magnetic poles of the yoke 55 and the yoke plate 55*a*.

While the present invention has been described above mainly in terms of a stepping motor, it may be needless to say that the present invention is applicable to synchronous motors and synchronous generators as well as other rotary electric devices.

As described above in detail, according to the present invention, there is provided a stator assembly of a rotary electric device comprising a yoke provided with a plurality of stationary magnetic poles and a yoke plate bonded to said yoke by means of synthetic resin in a mold to form an integral unit for enclosing a stator coil or a stator assembly constituted by two stator subassemblies, each comprising a yoke provided with a plurality of stationary magnetic poles and a yoke plate for enclosing a stator coil and, in either case, the components of the assembly are aligned by means of an alignment pin to be engaged with the yoke and the yoke plate so that the assembly can be constructed accurately in a simple manner without adding up the tolerances of the components in different assembling steps as in known conventional assemblies. Additionally, since an alignment section may be formed on the yoke and the yoke plate only in the molding operation for bonding the components together so that the overall assembly may have a simple configuration and can be produced with an enhanced level of precision of assembling to reduce the manufacturing cost of the stator assembly and the rotary electric device comprising such an assembly.

What is claimed is:

1. A stator assembly of a rotary electric device having a yoke, a yoke plate and a stator coil which are integrated by a synthetic resin comprising:

a yoke having a plurality of stationary magnetic poles;

a yoke plate having a plurality of stationary magnetic poles;

a stator coil disposed between said yoke and said yoke plate;

alignment notches provided on a surface of said yoke for mating with alignment pins disposed in a mold;

a synthetic resin filled between said yoke and said yoke plate, said synthetic resin filled to upper surfaces of said yoke and yoke plate respectively, and fixing said yoke, said yoke plate and said stator coil together; and small holes provided in a surface of said synthetic resin over said alignment notches, said alignment pins excluding said synthetic resin therefrom to form said small holes.

2. The stator assembly of said rotary electric device according to claim 1, wherein said stator assembly includes two stator subassemblies, each comprising said yoke provided with said plurality of stationary magnetic poles and said yoke plate for enclosing said stator coil.

3. The stator assembly of said rotary electric device according to claim 1, wherein said alignment notch is formed between a pair of selected and adjacently disposed stationary magnetic poles of said yoke.

4. The stator assembly of said rotary electric device according to claim 1, wherein said alignment notch is formed between a pair of selected and adjacently disposed stationary magnetic poles of said yoke plate.

* * * * *

UNITED STATES PATENT AND TRADEMARK OFFICE
CERTIFICATE OF CORRECTION

PATENT NO. : 6,396,189 B1 Page 1 of 1
DATED : May 28, 2002
INVENTOR(S) : Kunitake Matsushita et al.

It is certified that error appears in the above-identified patent and that said Letters Patent is hereby corrected as shown below:

Column 1,
Line 14, change "device" to -- devices --.
Line 50, insert -- . -- after "components".

Column 2,
Line 7, change "of" to -- on --.

Column 4,
Line 17, change "vase" to -- base --.
Line 64, after "subassembly" insert -- A --.

Column 5,
Line 27, change "is" to -- in --.

Signed and Sealed this

Twentieth Day of August, 2002

Attest:

JAMES E. ROGAN
Attesting Officer   Director of the United States Patent and Trademark Office